United States Patent [19]
Benedict

[11] Patent Number: 5,803,354
[45] Date of Patent: Sep. 8, 1998

[54] TEMPERATURE RESPONSIVE FLUID FLOW CONTROLLERS

[76] Inventor: Charles E. Benedict, 3114 Lakeshore Dr., Tallahassee, Fla. 32312

[21] Appl. No.: 664,545

[22] Filed: Jun. 17, 1996

[51] Int. Cl.[6] .................................................. G05D 23/13
[52] U.S. Cl. ...................................... 236/12.2; 236/101 D
[58] Field of Search ............................... 236/93 R, 93 B, 236/101 D, 12.16, 12.2, 12.23

[56] References Cited

U.S. PATENT DOCUMENTS

| | | |
|---|---|---|
| 2,556,777 | 6/1951 | Reimuller . |
| 3,388,861 | 6/1968 | Harding .................................. 236/12.2 |
| 3,396,749 | 8/1968 | Troutman . |
| 3,856,206 | 12/1974 | Bell et al. . |
| 4,210,284 | 7/1980 | Tarnay et al. . |
| 4,227,646 | 10/1980 | Hart et al. ............................ 236/101 D |
| 4,262,844 | 4/1981 | Sekiya . |
| 4,281,790 | 8/1981 | McGinnis . |
| 4,480,784 | 11/1984 | Bennett . |
| 4,570,851 | 2/1986 | Cirillo .................................... 236/93 R |
| 4,775,101 | 10/1988 | Hall . |
| 4,778,104 | 10/1988 | Fisher .................................. 236/101 D |
| 4,848,388 | 7/1989 | Waldbusser . |
| 4,848,653 | 7/1989 | Van Becelaere ..................... 236/101 D |
| 4,932,429 | 6/1990 | Watanabe et al. ................... 236/101 D |
| 5,014,520 | 5/1991 | Orner et al. ......................... 236/101 D |
| 5,123,593 | 6/1992 | Rundle ................................ 236/101 D |
| 5,259,554 | 11/1993 | Ewing et al. . |
| 5,261,597 | 11/1993 | Perlman et al. . |
| 5,440,961 | 8/1995 | Tsutsui et al. ......................... 236/12.2 |

*Primary Examiner*—William E. Tapolcai
*Attorney, Agent, or Firm*—Dowell & Dowell, P.C.

[57] ABSTRACT

Controllers for regulating fluid flow, and especially flow of liquid in supply lines, each of which include a valve assembly which is slidably positioned in a bore extending transverse to a fluid passageway extending through the body of the controller. Each controller includes a shaped memory alloy spring which is mounted so as to be in heat exchange relationship with fluid flowing therethrough. Each spring is mounted adjacent a stem of a valve and is operable when heated to a predetermined activation temperature to shift the valve assembly to at least partially close the fluid passageway. In some embodiments, the valve assembly is manually operable at temperatures below the activation temperature to regulate flow through the controllers. In other embodiments, the valve assembly is automatically shifted to open the fluid passageway through the body of the controller when temperatures decrease below the activation temperature.

11 Claims, 4 Drawing Sheets

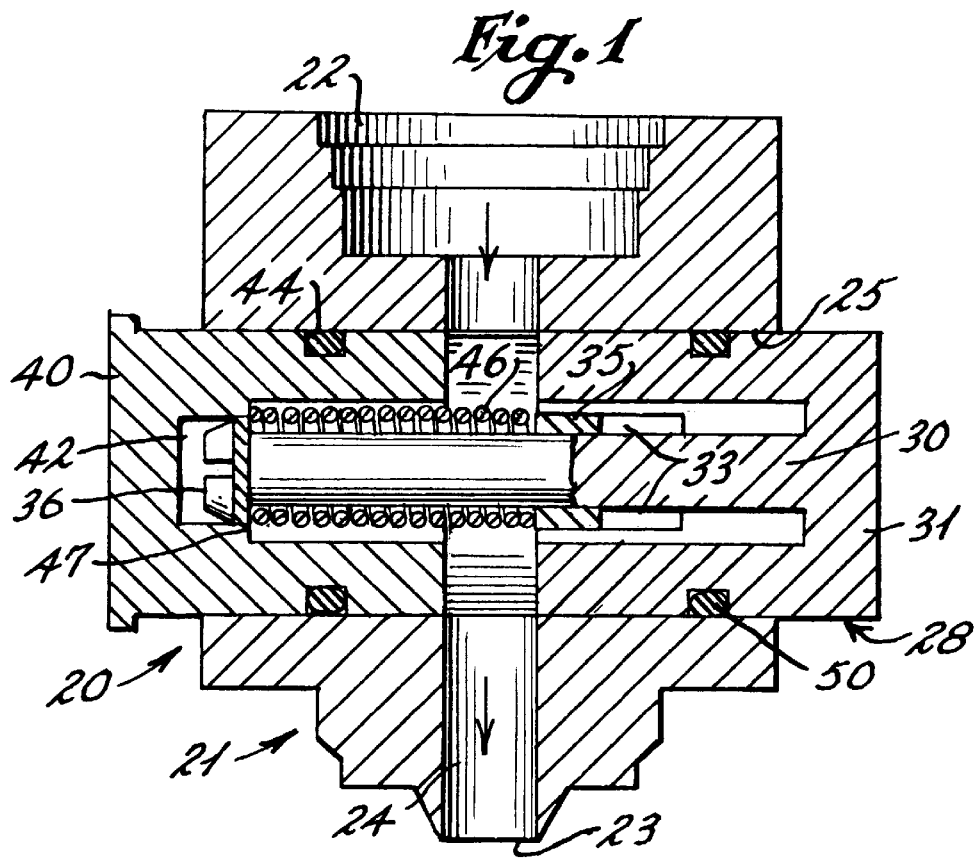
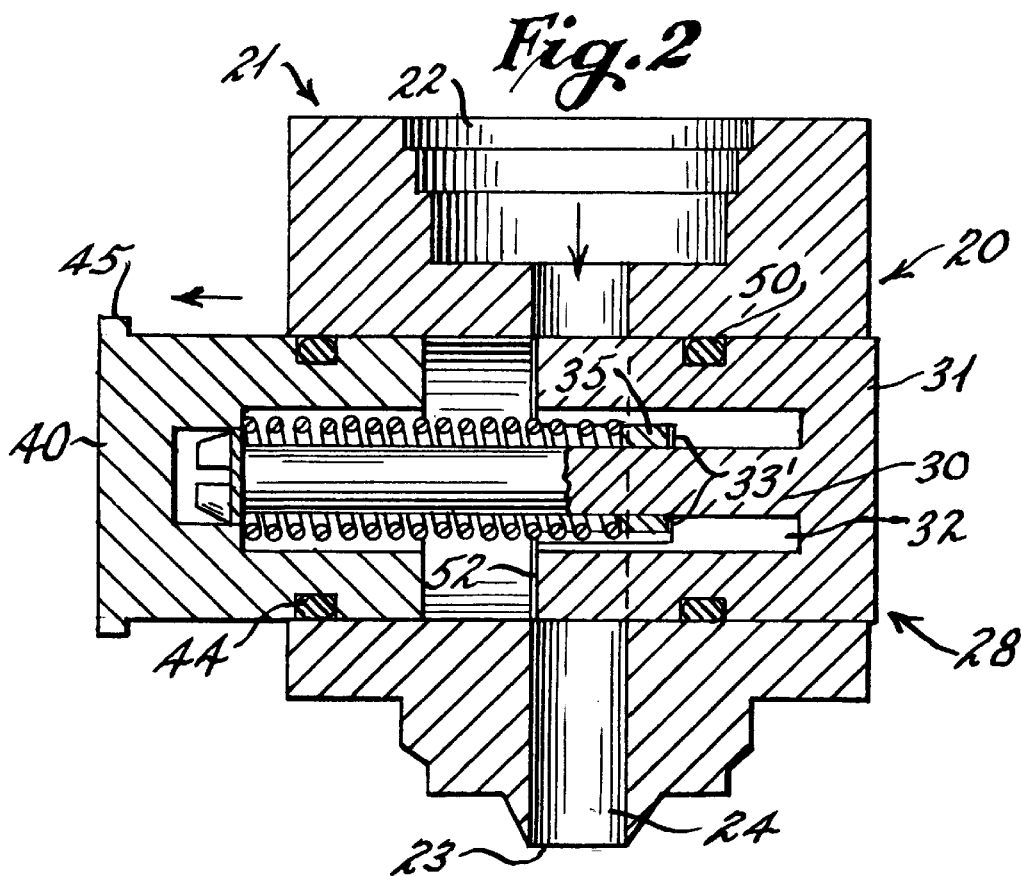

TEMPERATURE RESPONSIVE FLUID FLOW CONTROLLERS

BACKGROUND OF THE INVENTION

1. Field of the Invention

This invention is generally directed to fluid flow control valves and, more particularly, to valves which are responsive to the temperature of fluids flowing in a passageway for automatically activating the valve to prevent or reduce fluid flow therethrough until the temperature of the fluid is below a predetermined activation temperature. The controllers of the present invention are particularly adaptable for liquid supply lines used for showers, bathtubs, sinks and the like, but also have utility in other areas wherein it is necessary to control the flow of a liquid, or other fluid, to terminate or partially terminate flow in the event the fluid temperature is above a predetermined temperature. In one embodiment, the controllers are used to maintain a generally constant temperature of a supplied fluid by functioning as a hot/cold fluid mixer.

2. History of the Related Art

There are many environments in which it is necessary to control the flow of hot gases or liquids to ensure industrial processing or to protect individuals from injury due to exposure. By way of example, in commercial and residential hot water supply systems intended for personal use, water temperatures will frequently exceed 125° to 130° F. At these temperatures, an individual can easily become scalded or burned by being in contact with the liquid in a matter of a few seconds. The requirement to regulate the temperature becomes even more critical in commercial environments where a large source of hot water supply is necessary during relatively short demand periods, such as in morning and evening hours. Often, temperatures are elevated in boilers or heaters of a large system so that a sufficient source of hot water is available to a great number of users at a given time. Even in household environments, a hot water supply may be set to a regulated temperature in excess of 130° F. for purposes of providing sufficiently hot temperatures for dishwashing and clothes washing. Under these circumstances, it is critical to ensure that such hot water is properly mixed with sufficiently cold water before an individual bathes, showers or washes.

One of the problems inherent with regulating fluid supplies depending upon temperature is the cost of a control system which can adequately function in a particular environment. Historically, the use of electronically controlled valves has not been satisfactory for commercial and residential uses. However, through the development of temperature sensitive metal alloys, it has been possible to create valves which are mechanically actuated in response to the temperature of fluids flowing through the valves.

Such mechanically operated valves incorporate spring elements made of metal alloys which are sensitive to temperature to vary the force of the springs depending upon the ambient temperature to which they are exposed. Such springs are formed of a bi-metallic alloy, some of which are referred to as shaped memory alloys, which exhibit a first biasing force regulated by their stiffness in a martensitic state, but which exhibit a greater force at elevated temperatures in their austenitic state. Therefore, such alloys can be treated so as to exhibit a transformation from a martensitic to an austenitic state at predetermined temperatures so that springs constructed therefrom automatically change their biasing force dependent upon temperature. Examples of valves incorporating shaped memory alloy spring elements are disclosed in U.S. Pat. Nos. 4,778,104 to Fisher, 4,848,388 to Waldbusser, 5,259,554 to Ewing, et al. and 5,261,597 to Perlman, et al.

There remains a problem with the prior art valves which utilize shaped memory alloy springs to automatically regulate flow of a gas or liquid through a supply line. Many valves are not constructed to operate consistently within a preselected temperature range, especially if the pressure within a supply line varies. In most systems, the spring elements are placed in line with the fluid flow through a valve and, therefore, the valve elements are subject to variations in fluid pressure created in either the opening or closing of the valves. Further, many prior art valves which provide for automatic control of a valve mechanism dependent upon the temperature of the fluid flowing therethrough do not allow for a manual override or a manual resetting of the valves. There are many instances in which a manual override would be beneficial for resetting a valve.

SUMMARY OF THE INVENTION

The present invention is directed to a temperature responsive fluid flow controller which may be utilized for regulating the flow of substantially any fluid, liquid or gas, through a fluid supply line and which has particular utility as a temperature responsive flow controller for use in regulating the supply of hot water in both commercial and residential environments. In many environments, the temperature of a source fluid, such as the hot water from a hot water heater, may be maintained at a temperature in excess of a temperature at which it is desired to supply the liquid to a showerhead, bathtub or sink faucet.

The controllers of the present invention include a housing which is preferably formed of a molded plastic material having at least one inlet and an outlet which are in communication through a flow passageway. A bore is provided through the housing in which a valve assembly is slidably received. The bore is oriented transverse to the flow passageway and intersects therewith so that the valve assembly also is transverse to the flow passageway. The valve assembly includes a valve stem member having a head portion at one end thereof. In a first embodiment, the head portion is separated from a portion of the stem by an annular slot which extends inwardly from the flow passageway in generally parallel relationship to the valve stem. A coil spring formed of a shaped memory alloy is mounted either within or about the valve stem so as to be at least partially in communication with the flow passageway whereby fluid flowing through the passageway contacts the spring.

In a first embodiment, the spring is retained relative to the stem by a cap member which is fitted to or secured with the outer portion of the stem. The cap has an inwardly extending skirt portion defining a cylindrical bore in which the stem and surrounding spring are positioned. Both the cap and the head portion of the valve stem are provided with an outer sealing O-ring which are slidably engageable against the walls defining the bore through the controller housing. To prevent the complete passage of the valve stem through the bore, the housing has stop members which extend into the bore adjacent to the flow passageway.

In a first position of the valve assembly, the flow passageway is open and the head portion of the valve stem is spaced from the fluid passageway. In this open position, the spring is in its martensitic state in a closely coiled configuration with one end abutting a portion of the valve assembly and the other end abutting a portion of the housing. At a predetermined temperature between 110° and 135° F., the alloy from which the activating spring is constructed will transform to its austenitic state, expanding rapidly, thereby forcing the valve assembly to shift, urging the head portion into the flow passageway where the head portion will substantially terminate flow through the passageway.

In the preferred embodiment, the valve assembly will not close the fluid passageway so that some fluid is allowed to pass through the controller. This will allow for pressure relief in the system and will continue to expose the activating spring to temperatures within the supply system.

In some embodiments, the valve assembly may be manually opened by pushing the valve assembly in a direction opposite that of the force of the actuating spring so that the head portion of the valve stem is spaced from the fluid flow passageway. In the event fluid temperatures remain too high, the valve will immediately close as the spring expands. However, if the fluid temperature has dropped below the predetermined activation temperature of the valve, the valve will remain in an open position.

In another embodiment, a second spring is mounted within the bore so as to be in opposition with the first spring. The second spring exerts sufficient force to overcome the force of the first spring as the first spring changes state at lower temperatures to the martensitic state of the metal alloy.

In yet another embodiment of the present invention, the controller will function as a fluid mixer placed upstream of a control valve for supplying fluids to an outlet such as a shower nozzle or faucet. In this embodiment, the controller housing includes inlets for both hot and cold fluids, and a common outlet which are connected by a flow path which extends through inlet and outlet openings on opposite sides of a slidable valve assembly which is mounted within a bore which extends transversely with respect to the fluid flow passage. The valve assembly is formed of a generally cylindrical valve stem having a pair of spaced inlet openings in one side wall thereof and which communicate with either the hot or cold fluid inlets depending upon the position of the valve assembly relative to the housing. At least one outlet opening is also formed in the valve stem which communicates with the outlet of the housing. One end or head of the cylindrical valve stem is sealed by an O-ring which is engageable with the inner walls of the housing spaced from the hot and cold fluid inlets.

Mounted within the cylindrical body of the valve stem is a shaped metal alloy spring of a type previously discussed. This spring engages a closed end wall of the housing and the opposing head of the valve stem. When the valve assembly is in a first open position, fluid is allowed to enter into the mixer from only the hot fluid inlet opening. However, if temperatures should exceed a predetermined activation temperature, the shaped metal alloy spring will change to its austenitic state, thereby expanding against a second spring retained in a chamber positioned on the opposite side of the head of the valve stem. As the activating spring expands, the valve assembly shifts communicating the cold fluid opening in the valve stem with the cold fluid inlet opening into the housing so that a mixture of cold and hot fluid is thereafter supplied to the downstream control valve. When the temperature drops below the activation temperature, the force of the second spring in the chamber will act to close the cold fluid inlet opening, allowing only the hot fluid to pass therethrough.

The second spring is retained within the chamber by an end cap having an adjustable member extending therethrough. The tension member may include a threaded shaft having a moveable compression plate secured thereto. The plate engages one end of the spring within the chamber so that, by turning the adjustment member, the plate will be either urged to compress the spring within the chamber to increase the force thereof or moved away from the spring to reduce the force thereof against the head of the valve stem.

It is a primary object of the present invention to provide controllers for regulating the flow of hot fluids in supply systems wherein each controller utilizes a valve assembly which is moveable transversely with respect to the flow passage through the controller so that the valve is operable without regard to supply line pressures. Thus, the operation of each valve assembly is dependent solely upon the temperature of the fluid flowing therethrough.

It is yet another object of the present invention to provide flow controllers for regulating the flow of a hot fluid to an outlet so as to automatically substantially terminate flow to the outlet in the event the temperature of the fluid is above a predetermined temperature and in which the valves may be manually reopened or automatically reopened, depending upon the specific environment in which they are to be used.

It is yet a further object of the present invention to provide temperature responsive fluid flow controllers having slidable valves incorporated therewith which are activated by shaped memory alloy springs which transform from a martensitic to an austenitic state at a predetermined temperature to thereby regulate the flow of hot fluid through the controllers.

It is yet another object of the present invention to provide temperature responsive fluid flow controllers which may be operative as fluid mixers which regulate hot and cold fluid supply sources to mix the sources in the event the hot fluid supply source reaches a temperature above a predetermined temperature so that thereafter, the cold fluid source is mixed with the hot fluid source, thereby maintaining operating temperatures at an appropriate or safe level.

It is a further object of the present invention to provide temperature responsive fluid flow controllers which are specifically adaptable for use in both commercial and residential environments for controlling the flow of a hot fluid, such as water, downstream of a heating source so that accidental contact with the water at temperatures above a predetermined temperature is substantially prevented as the controllers will shut off such fluid flow until operating temperatures within the supply system are decreased to a safe level.

BRIEF DESCRIPTION OF THE DRAWINGS

FIG. 1 is cross-sectional view taken through a first embodiment of a fluid flow controller of the present invention showing a valve assembly in a first open position relative to a fluid passageway through the controller housing;

FIG. 2 is a cross-sectional view similar to FIG. 1 showing the valve assembly in a second substantially closed position with respect to the fluid flow passageway through the controller housing;

DESCRIPTION OF THE PREFERRED EMBODIMENT

Figure 3:
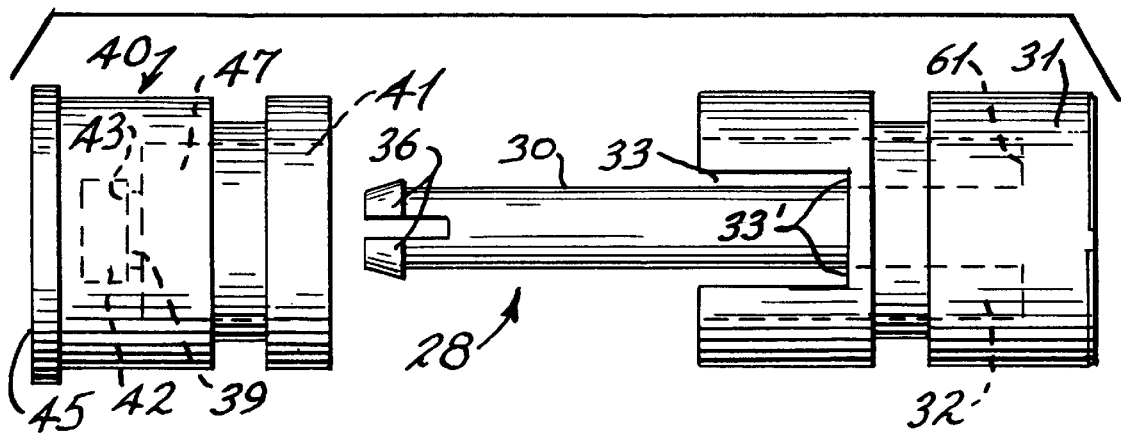
FIG. 3 is an enlarged assembly view of the valve stem and cap of FIGS. 1 and 2.

With continued reference to the drawings, a first embodiment of temperature responsive fluid flow controller 20 is shown having a housing 21, preferably molded of an ABS plastic material. The housing includes an inlet opening 22 which communicates with an outlet opening 23 by way of a fluid passageway 24. A bore 25 extends through the housing in transverse, and preferably in perpendicular, relationship with respect to the passageway 24.

Figure 4:
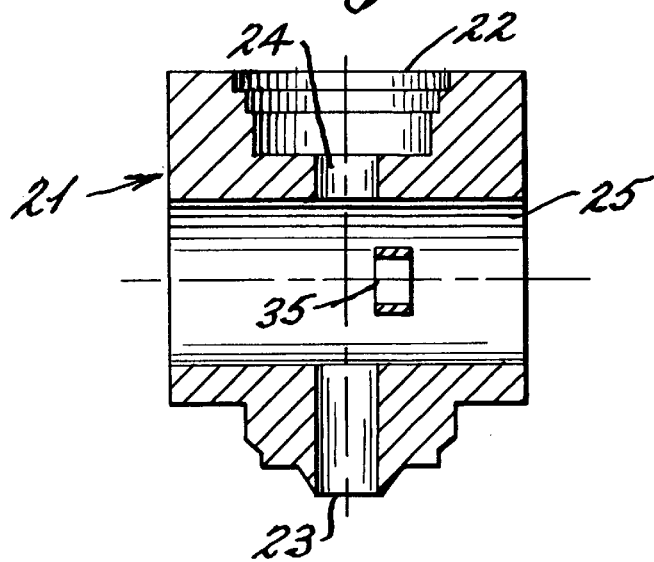
FIG. 4 is a reduced cross-sectional view of the housing of FIGS. 1 and 2 showing the valve assembly stops.

A valve assembly 28 is slidably mounted within the bore 25 so as to be moveable from a first open position in which fluid may pass through the passageway 24, as shown in FIG. 1, to a second generally closed position wherein fluid flow is substantially terminated through the fluid passageway 24, as shown in FIG. 2. The valve assembly includes a valve stem member 30 having a generally cylindrical head portion 31 with an annular groove 32 formed therein. A pair of generally opposing slots 33 are cut into the side walls of the head portion so as to communicate with the annular groove 32. A pair of guide stops 35 are molded with the housing 21 and extend into the bore 25 adjacent the passageway 24. The stops act as guides and as stops for controlling the movement of the valve assembly within the bore 25. With reference to FIG. 3, the stops extend within the slots 33 of the valve stem member and thereby effectively prevent any rotation of the valve stem relative to the housing 21. Further, the end walls 33' of each slot act as abutments for engaging the stops 35, see FIG. 4, when the valve assembly is shifted to the second, or closed, position of FIG. 2.

The valve stem member 30 includes outer bifurcated barbed locking elements 36 which are slightly tapered so as to be insertable through an opening 39 formed in a valve cap 40. The valve cap includes a generally cylindrical open chamber 41 through which the valve stem 30 extends. A counter sunk opening 42 is also provided in the cap which communicates with the open chamber 41 through the opening 39. When the bifurcated barbed end portions of the valve stem are inserted through the opening 39, the barbs will lock on an annular flange 43 formed between the opening 39 and the opening 42.

The cap further includes an annular recess in the outer wall thereof in which an O-ring 44 is selectively seated. The outermost end of the cap includes an outwardly extending flange 45 for purposes of limiting the movement of the valve assembly relative to the housing 21 as the flange will abut the side wall of the housing when the valve assembly is moved to the rightmost position, as shown in FIG. 1, relative to the housing 21.

In order to automatically shift the valve from the position shown in FIG. 1 to the position shown in FIG. 2 in the event that the fluid temperature passing through the passageway 24 exceeds a predetermined temperature, a shaped memory alloy coil spring 46 is mounted within the chamber 41 surrounding the valve stem member 30. One end of the spring abuts an end wall 47 of the chamber 41 and the opposite end abuts one side of the stop members 35. The spring 46 is preferably formed of a shaped memory element alloy such as nickel, titanium or nickel/titanium/copper. The particular alloy or alloys from which the spring may be made may vary depending upon whether a gradual movement of the valve assembly from the open to the closed position is desired or whether a snap-action of the valve position is desired. To develop a snap-action, some resistance must be provided between the valve assembly and the housing. In the present embodiment, the O-ring 44 associated with the cap of the valve assembly and another O-ring 50 mounted in an annular groove in the head portion of the valve stem will resist movement of the valve assembly. The resistance force must be overcome by the shaped memory alloy coil spring 46 as the alloy increases in temperature, thereby changing from a martensitic state to an austenitic state.

As the valve member is disposed transversely to the flow passage 24, the pressure within the passageway or elsewhere in the supply system will not affect the operating characteristics of the valve assembly. Therefore, whenever the temperature of the fluid flowing therethrough heats the spring to the desired temperature wherein the change in state occurs, the valve will automatically move to a closed position, as shown in FIG. 2. When the preselected temperature which may vary from between 110° to 135° F. is reached, for example, in a residential or commercial hot water supply system, the spring will rapidly expand and simultaneously push against the stops 35 and the inner wall of the cap 28, thereby driving the stem assembly to the left, as shown in FIG. 2. In the second or closed position, it should be noted that the annular face 52 of the head portion 31 is spaced slightly from a fully closed position with respect to the fluid passageway and therefore, a limited amount of fluid flow is allowed to pass through the passageway. This bleeding of the flow is desired so as to not adversely increase pressures between an upstream valve and the controller. In addition, the steady passage of a trickle of fluid is desired so that when the fluid decreases to a safe operating temperature, the fluid will continue to change the temperature of the shaped memory alloy coil spring so that the spring pressure can be overcome to open the valve to the position of FIG. 1.

In this respect, the embodiment of FIGS. 1 and 2 is directed to a manual resettable valve. Once the temperature of the fluid decreases to a safe operating temperature, the valve assembly 28 may be manually pushed to the right from the position in FIG. 2 to the position in FIG. 1, thereby opening the passageway 24. The movement will be limited by the lip or flange provided on the cap portion of the valve assembly. In the event that the fluid temperature remains at too high a temperature, the valve will instantly close to the position of FIG. 2 under the influence of the spring 46.

Figure 5:
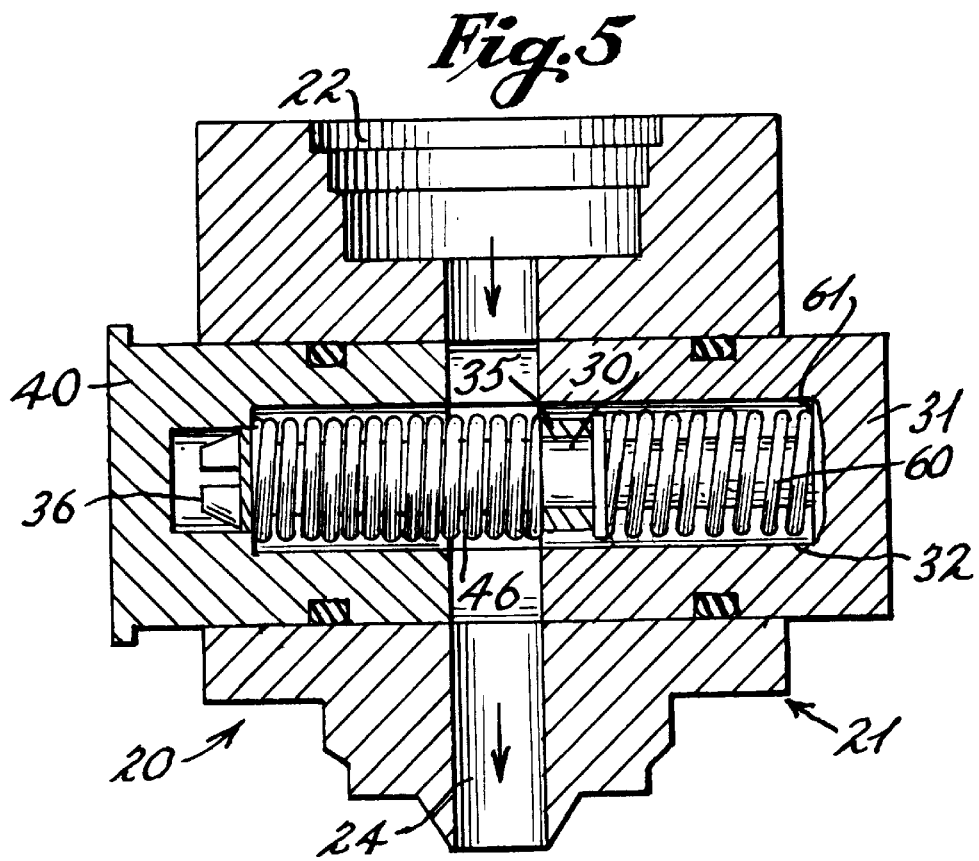
FIG. 5 is a cross-sectional view of a second embodiment of the valve assembly of the present invention showing the valve assembly in an open position relative to the fluid passageway through the controller housing.
Figure 6:
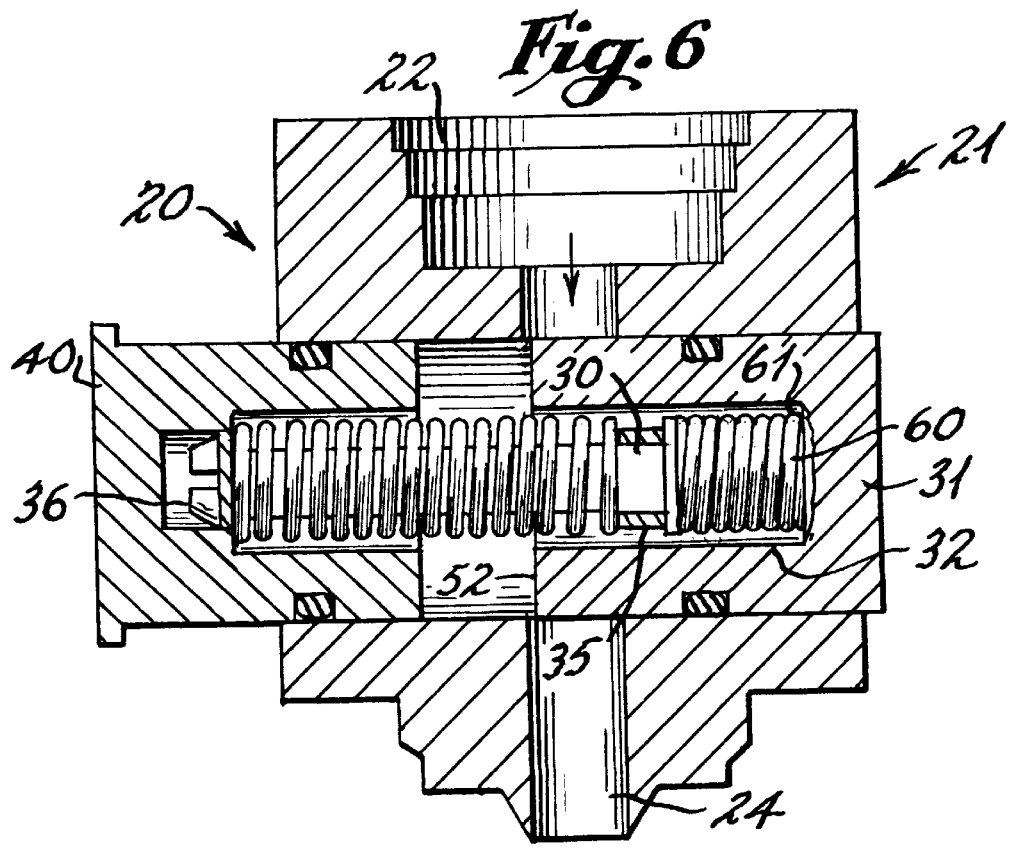
FIG. 6 is a cross-sectional view similar to FIG. 5 showing the valve stem assembly in a substantially closed position relative to the fluid passageway through the controller housing.

With specific reference to FIGS. 5 and 6, a modified embodiment of the present invention is disclosed. The modified embodiment is substantially identical to the previous embodiment with the exception that the controller is constructed to be automatically reset, or optionally manually reset, to the open position.

The same numbers are utilized in the drawing figures as they relate to the elements of the previous embodiment. In this embodiment, a second spring 60 is mounted about the stem 30 within the annular recess 32. One end of the spring abuts an end wall 61 of the head portion of the valve stem and the other end abuts the stop members 35. The spring 60 is placed in compression when the actuating spring 46 substantially closes the valve, as shown in FIG. 6. As the spring 46 begins to cool, it will change state, thereby allowing the force of the spring 60 to become greater, thus driving the piston assembly to the right, opening the passageway 46, as shown in FIG. 5. The present embodiment may also be operated manually by simply urging the piston assembly to the right to its fully open or first position.

Figure 7:
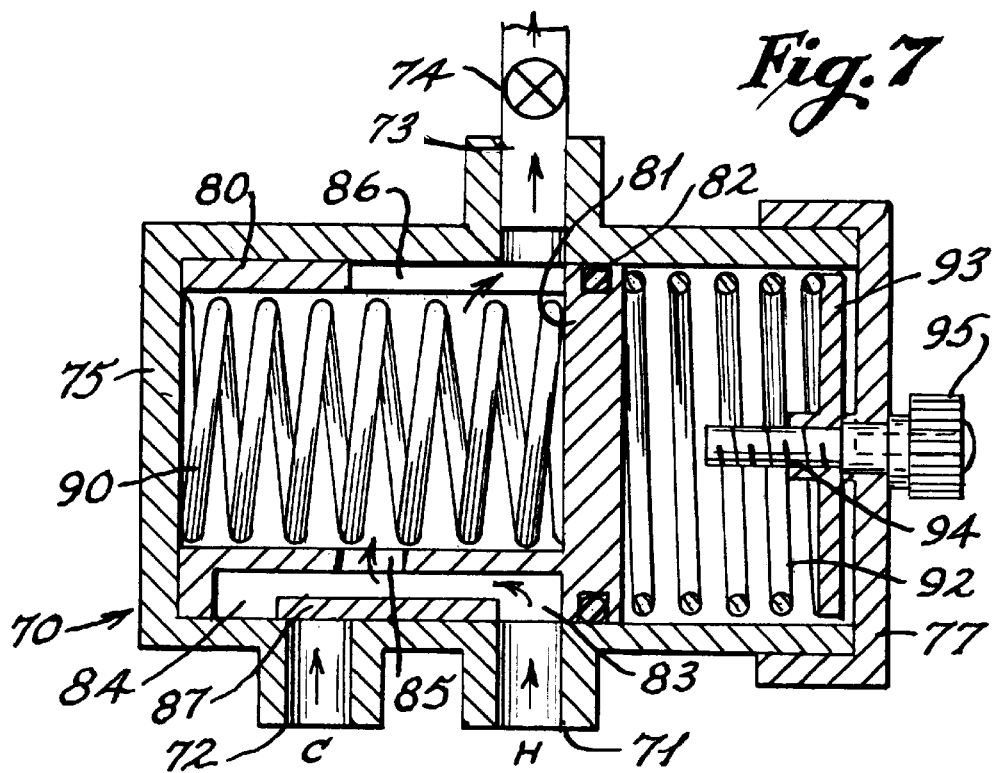
FIG. 7 is a cross-sectional view of another embodiment of the present invention wherein the controller housing and valve assembly are utilized as a fluid mixer to mix a cold source of fluid with a hot source of fluid at temperatures above a predetermined temperature with the controller being shown in this figure as allowing only the hot source of fluid to pass therethrough.
Figure 8:
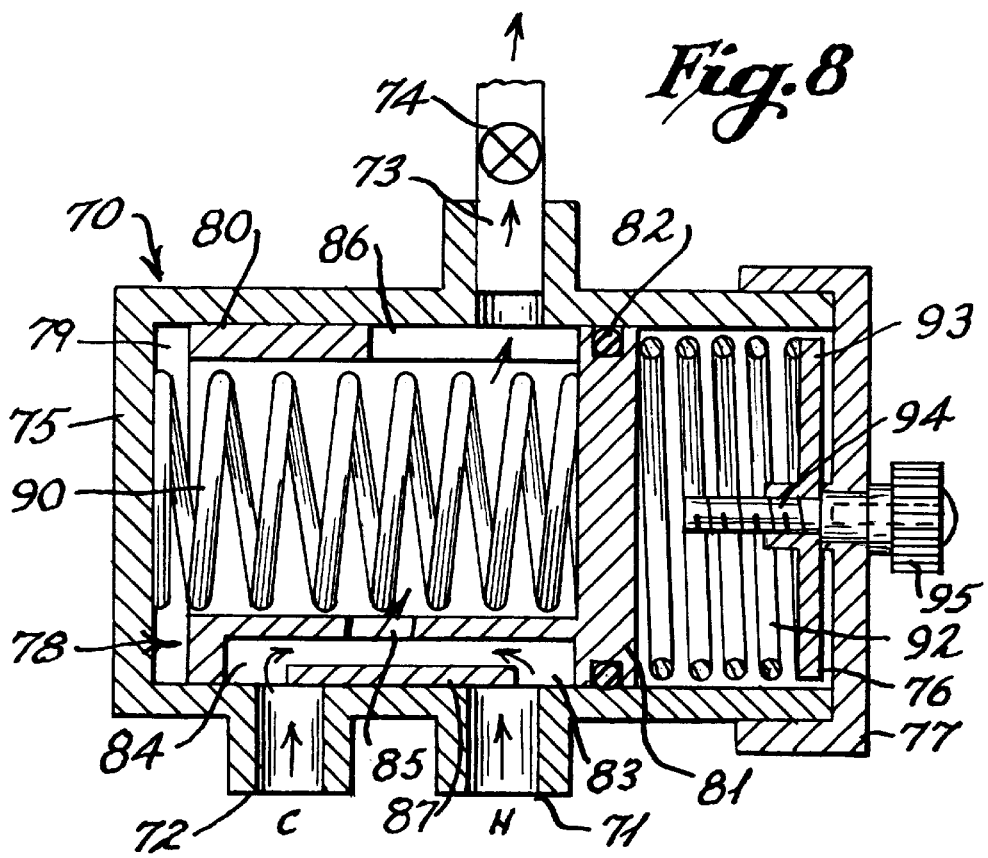
FIG. 8 is a view similar to FIG. 7 showing a mixing of hot and cold fluid sources through the controller housing.

With particular references to FIGS. 7 and 8, another embodiment of the present invention is shown in greater detail. In this embodiment, the controller 65 is designed to be placed upstream of an on/off valve for supplying an outlet which may be, for example, a showerhead or bathtub or sink faucet. In this embodiment, the controller is designed to act as a fluid mixer which functions to maintain temperatures below a predetermined maximum by allowing a cold fluid to be mixed with a hot fluid. The controller includes a housing 70 having a hot fluid inlet 71 and a cold fluid inlet 72 which communicate through the housing to an outlet 73 positioned upstream of an on/off valve 74. The housing is generally cylindrical in configuration, having a closed end wall 75 and an open end 76 which is closed by a cap 77. A valve assembly 78 is mounted within a bore 79 the housing 70 and includes a generally cylindrical or hollow valve stem 80 which extends from a valve head 81 which is annular in configuration and which is sealed to prevent fluid flow between the head and the side walls of the housing by an O-ring 82. The valve stem includes a hot fluid inlet opening 83 and a cold fluid inlet opening 84 which communicate through a secondary inlet opening or fluid mixing passageway 85 through which fluid flows through the hollow stem to an elongated outlet opening 86 which is in fluid communication with the outlet 73 of the housing. A portion of the outer side wall 87 of the hollow valve stem functions as a valve seat, depending upon the position of the valve stem within the housing.

In a first position of the hollow valve stem, the hot fluid inlet opening 83 of the valve assembly is open to the hot fluid inlet 71 of the housing with the cold fluid inlet 72 being closed by the side wall valve seat 87. However, if the valve assembly is shifted to the right of the position shown in FIG. 10 to the position shown in FIG. 11, fluid flow is established through both the cold fluid and the hot fluid inlets 72 and 71, respectively, and through the mixing passageway 85, the hollow valve stem to the outlet 73 of the controller. In order to regulate the temperature at which cold fluid is allowed to mix with the hot fluid, a first shaped memory alloy spring 90 is mounted within the hollow valve stem 80 so as to be in heat exchange relationship with fluid flowing from the mixing passageway 85 toward the fluid outlet 86 and includes one end for abutting the closed end wall 75 of the housing and a second end which abuts the head 81 of the valve assembly. The material from which the spring is made may be any alloy which changes from a martensitic state at temperatures below a preselected temperature to an austenitic state at temperatures above the preselected temperature. The temperature may be selected, for instance, between 110° and 135° F. The spring 90 applies pressure to move the valve stem away from the closed end wall 75. This movement is offset by a secondary coil spring 92 mounted within the bore 79 in an area of a chamber formed between the head portion 81 of the valve stem and the cap 77 of the housing. Spring 92 may be any conventional metallic spring which applies a fairly constant biasing force toward the left or closed end wall 75 of the housing. In order to adjust the amount of biasing force of the spring 92, a pressure plate 93 is mounted to a threaded shaft 94 of an adjustment screw 95. By adjusting the screw, the pressure plate 93 may be urged against one end of the spring 92 to increase the amount of biasing force. By rotating the screw in the opposite direction, the force on the spring may be decreased.

In the use of the controller 65, when the downstream valve 74 is turned on to allow fluid flow, the controller 70 will be in the position shown in FIG. 7, allowing substantially all flow to come from the hot fluid source. As the temperature of the hot fluid increases as it is received from a source of hot fluid supply, the temperature of the spring 90 will increase to the point where the material changes state and suddenly expands against the pressure of the opposing spring 92 toward the position shown in FIG. 8. In this embodiment, the particular alloy utilized for the spring 90 may allow a slow expansion over a temperature range so that the valve seat 87 increasingly opens the cold fluid inlet 72 into the housing, thereby adjusting the temperature of the fluid passing through the controller to the outlet 73. When the downstream valve 74 is turned off or the temperature through the controller drops below the predetermined range, the spring 92 will bias the valve assembly back to the position shown at FIG. 7.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A temperature responsive fluid flow controller for regulating fluid flow to an outlet so as to regulate flow above a predetermined temperature, the controller comprising, a housing having first and second spaced fluid inlets and a fluid outlet, a fluid passageway communicating said first and second spaced fluid inlets and said outlet in said housing, a bore extending transversely to said fluid passageway between opposite end walls of said housing, a valve assembly slidably disposed within said bore and moveable between a first position wherein said valve assembly permits flow through said fluid passageway to a second position wherein said valve assembly at least partially regulates fluid flow through said fluid passageway, said valve assembly including a tubular valve stem having first and second spaced fluid inlets and a fluid outlet, said first fluid inlet of said housing being positioned so as to communicate with said first fluid inlet in said valve stem when said valve assembly is in said first position and said second fluid inlet of said housing being positioned so as to be substantially closed with respect to said second fluid inlet when said valve assembly is in said first position but being positioned to be progressively opened to communicate with said second fluid inlet in said valve stem when said valve assembly is moved toward said second position, and a first shaped memory alloy spring means of a type in which the alloy changes state dependent upon temperature mounted within said bore, said first spring means communicating with said fluid passageway so as to be in heat exchange relationship to the fluid passing therethrough whereby when the fluid temperature increases to said predetermined temperature, said first spring means changes state to thereby shift said valve assembly from said first position toward said second position.

2. The temperature responsive fluid flow controller of claim 1 including a second spring means mounted within said bore so as to apply an opposing force relative to said first spring whereby said second spring means automatically shifts said valve assembly from said second position to said first position when the temperature of said first spring means fails below said predetrmined temperature.

3. The temperature responsive fluid flow controller of claim 2 including adjusting means for adjusting the biasing force of said second spring means.

4. The temperature responsive fluid flow controller of claim 1 in which one of said opposite end walls of said housing includes a cap portion, said cap portion includes an outer flange which extends outwardly relative to said bore.

5. A temperature responsive fluid flow controller for regulating fluid flow to an outlet so as to regulate flow at temperatures at or above a predetermined temperature, the controller comprising, a housing having a first hot fluid inlet and a second cold fluid inlet and a fluid outlet, a fluid mixing passageway communicating said first hot fluid and said second cold inlets and said outlet of said housing, a bore extending transversely to said fluid mixing passageway, a valve assembly slidably disposed within said bore and moveable between a first position wherein said valve assembly permits a first flow from said first hot fluid inlet through said fluid mixing passageway to a second position wherein said valve assembly alters the fluid flow through said fluid mixing passageway from said first hot fluid inlet and said second cold fluid inlet, a first shaped memory alloy spring means of a type in which the alloy changes state dependent upon temperature mounted within said bore and having a first end engaging said valve assembly and a second portion engaging a first portion of said housing, said first spring means being in open communication with said fluid mixing passageway so as to be in heat exchange relationship with a fluid passing therethrough whereby when the fluid temperature increases to said predetermined temperature, said first spring means changes state to thereby shift said valve assembly from said first position to said second position, and said valve assembly including a valve stem having first and second fluid inlets and an outlet, said first fluid inlet of said valve assembly communicating with said first hot fluid inlet of said housing when said valve assembly is in either said first or second position and said second fluid inlet of said valve assembly being aligned so as to be closed to said second cold fluid inlet in said housing when said valve assembly is in the said first position but is progressively opened to communicate with said second cold fluid inlet as said valve assembly moves toward said second position to thereby allow a greater volume of a cold fluid to be mixed in said fluid mixing passageway with a hot fluid.

6. The temperature responsive fluid flow controller of claim 5 including a second spring means mounted within said bore so as to apply an opposing force relative to said first spring means, said second spring means having one end in biased engaged relation to said valve assembly and a second end in biased engagement toward said housing whereby said second spring means automatically shifts said valve assembly from said second position to said first position when the temperature of said first spring means falls below said predetermined temperature.

7. The temperature responsive fluid flow controller of claim 6 wherein said fluid mixing passageway is formed as a secondary inlet opening in said valve stem which is in open communication with said first and second fluid inlets thereof.

8. A temperature responsive fluid flow controller for regulating fluid flow to an outlet so as to regulate flow above a predetermined temperature, the controller comprising, a housing having first and second spaced fluid inlets and a fluid outlet, a fluid passageway communicating said first and second spaced fluid inlets and said outlet in said housing, a bore extending transversely to said fluid passageway between opposite end walls of said housing, a valve assembly slidably disposed within said bore and moveable between a first position wherein said valve assembly permits flow through said fluid passageway to a second position wherein said valve assembly at least partially regulates fluid flow through said fluid passageway, said valve assembly including a tubular valve stem having first and second spaced fluid inlets and a fluid outlet, said first fluid inlet of said housing normally communicating with said first fluid inlet in said valve stem when said valve assembly is in said first position and said second fluid inlet of said housing normally communicating with said second fluid inlet in said valve stem when said valve assembly is in said second position, and a first shaped memory alloy spring means of a type in which the alloy changes state dependent upon temperature mounted within said bore, said first spring means is mounted within said valve stem, said valve stem including a head portion, sealing means for sealing said head portion relative to side walls defining said bore within said housing, a first end of said first spring means engaging said end wall of said housing and a second end of said first spring means engaging said head portion of said valve stem, said first spring means communicating with said fluid passageway so as to be in heat exchange relationship to the fluid passing therethrough whereby when the fluid temperature increases to said predetermined temperature, said first spring means changes state to thereby shift said valve assembly from said first position to said second position.

9. The temperature responsive fluid flow controller of claim 8 including a second spring means mounted between said head portion of said valve stem and the other of said opposite end walls of said housing for normally urging said valve assembly towards said first position.

10. The temperature responsive fluid flow controller of claim 9 including means for adjusting a biasing force of said second spring means against said valve assembly.

11. A temperature responsive fluid flow controller for regulating fluid flow to an outlet so as to regulate flow above a predetermined temperature, the controller comprising, a housing having first and second spaced fluid inlets and a fluid outlet, a fluid passageway communicating said first and second spaced fluid inlets and said outlet in said housing, a bore extending transversely to said fluid passageway between opposite end walls of said housing, a valve assembly slidably disposed within said bore and moveable between a first position wherein said valve assembly permits flow through said fluid passageway to a second position wherein said valve assembly at least partially regulates fluid flow through said fluid passageway, said valve assembly including a tubular valve stem having first and second spaced fluid inlets and a fluid outlet, said first and second fluid inlets communicating with one another so that fluid flowing therethrough is mixed as it passes through a secondary inlet into a spring cavity defined within said tubular valve stem, said first fluid inlet of said housing with said first fluid inlet in said valve stem when said valve assembly is in said first position and said second fluid inlet of said housing being positioned to be progressively opened to communicate with said second fluid inlet in said valve stem when said valve assembly is moved toward said second position, and a first shaped memory alloy spring means of a type in which the alloy changes state dependent upon temperature mounted within said bore, said first spring means being mounted within said spring cavity so as to be in communication with said fluid passageway so as to be in heat exchange relationship to the fluid passing through said secondary inlet whereby when the fluid temperature increases to said predetermined temperature, said first spring means changes state to thereby shift said valve assembly from said first position toward said second position.

* * * * *